US008308355B2

(12) United States Patent
Lane et al.

(10) Patent No.: US 8,308,355 B2
(45) Date of Patent: Nov. 13, 2012

(54) CYCLE COUNTING

(75) Inventors: John A. Lane, Weedsport, NY (US);
Tyson B. Whitaker, Arden, NC (US);
Matthew J. Kinsley, Liverpool, NY (US); Craig M. Meyerson, Syracuse, NY (US); Scott A. Martin, Warners, NY (US); Ray D. Stone, Camillus, NY (US); David E. Quinn, Auburn, NY (US)

(73) Assignee: Welch Allyn, Inc., Skaneateles Falls, NY (US)

( * ) Notice: Subject to any disclaimer, the term of this patent is extended or adjusted under 35 U.S.C. 154(b) by 810 days.

(21) Appl. No.: 12/181,577

(22) Filed: Jul. 29, 2008

(65) Prior Publication Data
US 2010/0027582 A1    Feb. 4, 2010

(51) Int. Cl.
*G01K 7/00*    (2006.01)
*G01K 1/00*    (2006.01)
*A61B 5/01*    (2006.01)

(52) U.S. Cl. ........ 374/153; 374/208; 374/209; 374/170; 600/549

(58) Field of Classification Search .................. 374/158, 374/209, 208, 170
See application file for complete search history.

(56) References Cited

U.S. PATENT DOCUMENTS

| | | | |
|---|---|---|---|
| 4,370,727 A | 1/1983 | Bellet | |
| 5,347,476 A | 9/1994 | McBean, Sr. | |
| 5,425,375 A | 6/1995 | Chin et al. | |
| 5,469,855 A * | 11/1995 | Pompei et al. | 600/474 |
| 5,867,809 A | 2/1999 | Soga et al. | |
| 6,000,845 A | 12/1999 | Tymkewicz | |
| 6,218,806 B1 | 4/2001 | Brotto et al. | |
| 6,241,679 B1 | 6/2001 | Curran | |
| 6,387,092 B1 | 5/2002 | Burnside et al. | |

(Continued)

FOREIGN PATENT DOCUMENTS
WO    WO 93/06776    4/1993

OTHER PUBLICATIONS

International Search Report and Written Opinion for PCT/US2009/051839, mailed Feb. 26, 2010 (11 pages).

*Primary Examiner* — Mirellys Jagan
(74) *Attorney, Agent, or Firm* — Hiscock & Barclay, LLP

(57) ABSTRACT

The present invention provides a platform for a manufacturer of reusable medical apparatuses to provide timely post-sale service for replaceable parts. In one embodiment, the probe assembly of an electronic thermometer has a connector that is equipped with a memory device, e.g., EEPROM, that stores a variety of probe-specific service information including usage count of the probe, probe warranty information and error codes. The user can plug the connector, e.g., through an adapter module, to a local computer's USB port and submit the stored service information to a website maintained by the probe manufacturer to check up and get service for the specific probe in a timely fashion. Automatic alert for replacement probe orders depending on the amount of usage, automatic generation of RMA numbers when the probe warranty is determined to be in effect, and automatic service calls for malfunctioning thermometers can all be accomplished accordingly without the need for manual record-keeping. A healthcare provider can simply set aside a day at a scheduled interval to check all of its reusable medial apparatuses equipped with the invented system to keep them safe and effective.

34 Claims, 5 Drawing Sheets

U.S. PATENT DOCUMENTS

| | | |
|---|---|---|
| 6,553,241 B2 | 4/2003 | Mannheimer et al. |
| 6,578,579 B2 | 6/2003 | Burnside et al. |
| 6,595,930 B2 | 7/2003 | Rosenheimer |
| 6,600,940 B1 | 7/2003 | Fein et al. |
| 6,651,669 B1 | 11/2003 | Burnside |
| 6,824,520 B2 | 11/2004 | Orr et al. |
| 6,971,790 B2 | 12/2005 | Quinn et al. |
| 6,979,812 B2 | 12/2005 | Al-Ali |
| 7,255,475 B2 | 8/2007 | Quinn et al. |
| 7,316,507 B2 | 1/2008 | Sisk et al. |
| 2001/0018659 A1* | 8/2001 | Koritzinsky et al. ............. 705/3 |
| 2002/0038081 A1* | 3/2002 | Fein et al. .................... 600/323 |
| 2003/0002562 A1 | 1/2003 | Yerlikaya et al. |
| 2003/0202558 A1 | 10/2003 | Chung et al. |
| 2004/0064351 A1* | 4/2004 | Mikurak ........................ 705/7 |
| 2005/0249263 A1 | 11/2005 | Yerlikaya et al. |
| 2005/0288571 A1* | 12/2005 | Perkins et al. ................ 600/407 |
| 2007/0080223 A1* | 4/2007 | Japuntich ..................... 235/439 |
| 2007/0255444 A1* | 11/2007 | Kauffman et al. ............ 700/117 |
| 2008/0294065 A1* | 11/2008 | Waldhoff et al. ............. 600/549 |
| 2010/0017163 A1* | 1/2010 | Yamaguchi et al. ........... 702/99 |

\* cited by examiner

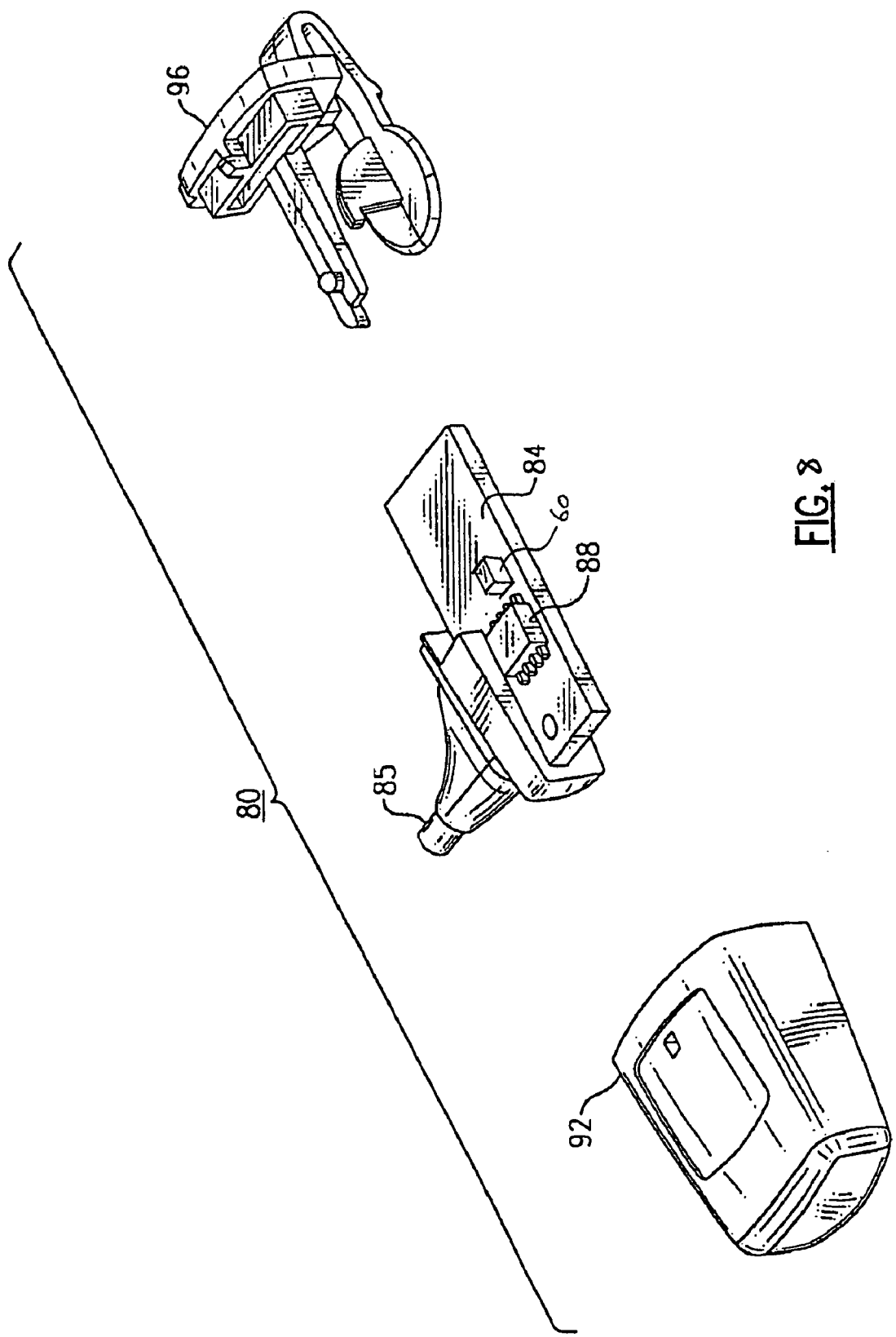

CYCLE COUNTING

BACKGROUND OF THE INVENTION

The present invention relates generally to reusable medical apparatuses and, more particularly, to thermometry devices with memories and post-sale servicing of such medical apparatuses.

Many reusable medical apparatuses have a finite lifetime based on usage after which they either fail or become more prone to failure than is considered safe or effective for its intended purposes. In the case of a thermometry device, for example, the active components such as the temperature-measuring probe may fail after excessive use. In some cases, the life of these devices has been found to be more a function of the usage cycles or number of procedures than the cumulative usage time.

Therefore, in order to keep these devices in good working condition, users need to keep track of either or both: the cumulative usage time, and the usage cycles. Often times, a reusable device gets used well beyond its intended lifetime without being noticed, which compromises its accuracy in the case of a measuring or diagnostic device, or efficacy in the case of a therapeutic device. Record keeping, however, requires constant diligence and obviously can be burdensome to nurses, doctors, and other healthcare providers especially for devices that are often used in routine patient visits such as thermometers. Even if the user keeps good record of usage, significant delays still occur when records indicate it is time for replacement. The delay could happen at the user level, for example, due to effort to match a particular piece of device with its warranty information in order to find out the cost of replacement or repair. The delay could happen at the distributor level. Distributors sometimes wait for a significant amount of orders or returns to accumulate before they contact the manufacturer.

When a device actually malfunctions or fails, the repair or replacement task faces similar delays. Warranty information needs to be located, and there is still the question whether the distributor will act promptly. Further, without on-site diagnosis of the problem, it is often hard to order the right part or send for the right repair-crew.

On the manufacturer side, RMA (Return Merchandise Authorization) calls are often the service call with the highest call volume. If these calls can be shortened or eliminated, for example, by allowing the user easy access to the right warranty information, much saving can be achieved.

Therefore, there is a need, unfulfilled by current products in the market, for a device or apparatus that assists in record-keeping of reusable medical apparatuses, in error diagnosis, and for expediting and simplifying the servicing and billing procedure for reordering parts or entire devices.

BRIEF SUMMARY OF THE INVENTION

In general, the present invention provides a platform for medical device manufacturers, suppliers, and service-providers to better service previously sold medical devices. The invention enables a reusable medical apparatus or device, for example, an electronic thermometer, to record information on the device that can be accessed and processed for service, repair and billing purposes, e.g., with regard to replaceable parts. At least three kinds of service information can be recorded and updated automatically this way:

(1) Number of uses: a record of usage cycles enables the device to alert the user when it is time to replace the device or parts of it;

(2) Warranty information: knowing whether the device is still under warranty can expedite the return/reorder process and to automate the generation of RMA numbers;

(3) Error codes: enables the user to identify the exact problem in the device and initiate more effective service calls or orders.

In one aspect, the present invention provides a novel electronic thermometer that is capable of storing, processing and displaying various service information by itself, i.e., on a stand-alone basis. The electronic thermometer includes a controlling base that houses controlling electronics programmed to at least calculate a sensed temperature, a probe assembly having a heat-conducting probe removably attached to the controlling base to communicate electrically with the controlling electronics, and an electronic memory associated with the probe assembly programmed to store at least one piece of the probe-specific service information.

In one embodiment, the electronic memory is an electrical erasable programmable read-only memory (EEPROM) that is disposed in a connector connected to the probe. The connector provides removable electrical connection between the probe assembly and the controlling electronics in the base unit of the thermometer. In one feature, the thermometer further includes a counter that generates the probe's usage count—that information is updated, after each use of the probe, and stored in the EEPROM. When the usage count reaches a predetermined number, which is programmable, an indicator generates a signal. The signal can be a user-actionable message, e.g., a message prompting the user to take certain action such as reordering a replaceable probe. In another embodiment, the electronic memory is disposed in the controlling base of the thermometer. Other probe-specific service information may include information related to a probe warranty or error codes.

In another aspect, the present invention provides a system for servicing a reusable medical apparatus. The system utilizes a remote processing facility which makes it possible to automate or otherwise expedite many post-sale services as the service providers can be connected directly to the end user through this system. The system of the present invention includes a reusable medical apparatus that has a reusable part and an electronic memory associated with the reusable part—the electronic memory being programmed to store at least one piece of service information specific to the reusable part—and a remote processing system programmed to process the service information for servicing the reusable medical apparatus.

In various embodiments, at least part of the remote processing system is disposed in a local computer or a handheld module, or connectable to the electronic memory in the medical apparatus through a network. In one feature, the network connection is the Internet, an intranet or an extranet. In another feature, the reusable medical apparatus is configured or adapted to plug into a Universal Serial Bus (USB) port. The reusable medical apparatus can be a medical sensor apparatus, e.g. a vital signs monitor. In one embodiment, the apparatus is a thermometer, spirometer, pulse oximeter, digital scale, sphygmomanometer, electronic stethoscope or a combination of any of the above. In another embodiment, the apparatus is an instrument for interrogating a sensory organ, such as the eye, ear, nose, throat, oral tract and skin. For example, the apparatus can be an otoscope, ophthalmoscope, retinoscope, autorefractor, tympanometer, audiometer, illuminator, laryngoscope, or rhinolaryngoscope.

In an embodiment, the remote processing system is programmed to initiate an order for the reusable part or the entire apparatus when a usage count of the reusable part stored in the electronic memory in the medical apparatus reaches a predetermined number. In another embodiment, based on information related to a warranty stored in the electronic memory, the remote processing system is programmed to generate a return merchandise authorization number if the warranty is in effect. In yet another embodiment, based on error codes stored in the electronic memory, the remote processing system is programmed to provide error information or initiate a service call.

In one embodiment, the present invention provides a system for servicing an electronic thermometer that includes:
an electronic thermometer having:
(a) a controlling base that houses controlling electronics programmed to at least calculate a sensed temperature;
(b) a probe assembly comprising a heat-conducting probe; and
(c) a connector in electrical communication with the heat-conducting probe and providing removable electrical connection between the probe assembly and the controlling electronics, the connector comprising an electrical erasable programmable read-only memory (EEPROM) that stores at least one piece of service information selected from the group consisting of usage count of the probe, probe warranty information, and probe error codes; and
a remote processing system accessible through an internetwork and programmed to process the at least one piece of service information for servicing the electronic thermometer.

In another aspect, the present invention provides a method of manufacturing a reusable medical apparatus such as a thermometer. The method includes the steps of programming an electronic memory to store at least one piece of service information specific to a reusable part (e.g., a thermometer probe) and connecting the electronic memory to the reusable medical apparatus. In one embodiment, the electronic memory is made to be accessible locally, e.g., through other parts of the apparatus and data is displayed locally. In another embodiment, the electronic memory is made to be accessible through a remote processing system described herein. In one example, the manufacturing method includes connecting the electronic memory to a connector, e.g., a USB plug, for access by the remote processing system.

A further aspect of the invention is a method for servicing a reusable medical apparatus. The method includes the steps of programming an electronic memory to store a service information specific to a reusable part of the apparatus, programming a remote processing system to process the information for servicing the reusable medical apparatus, and connecting the electronic memory to the remote processing system, e.g., through a network. The electronic memory can be associated with the medical apparatus, e.g., by being disposed in the reusable part or in a connector outside the reusable part.

BRIEF DESCRIPTION OF THE DRAWINGS

FIGS. 7 and 8 are exploded view of the connector assembly of FIG. 6.

DETAILED DESCRIPTION OF THE INVENTION

Figure 1:
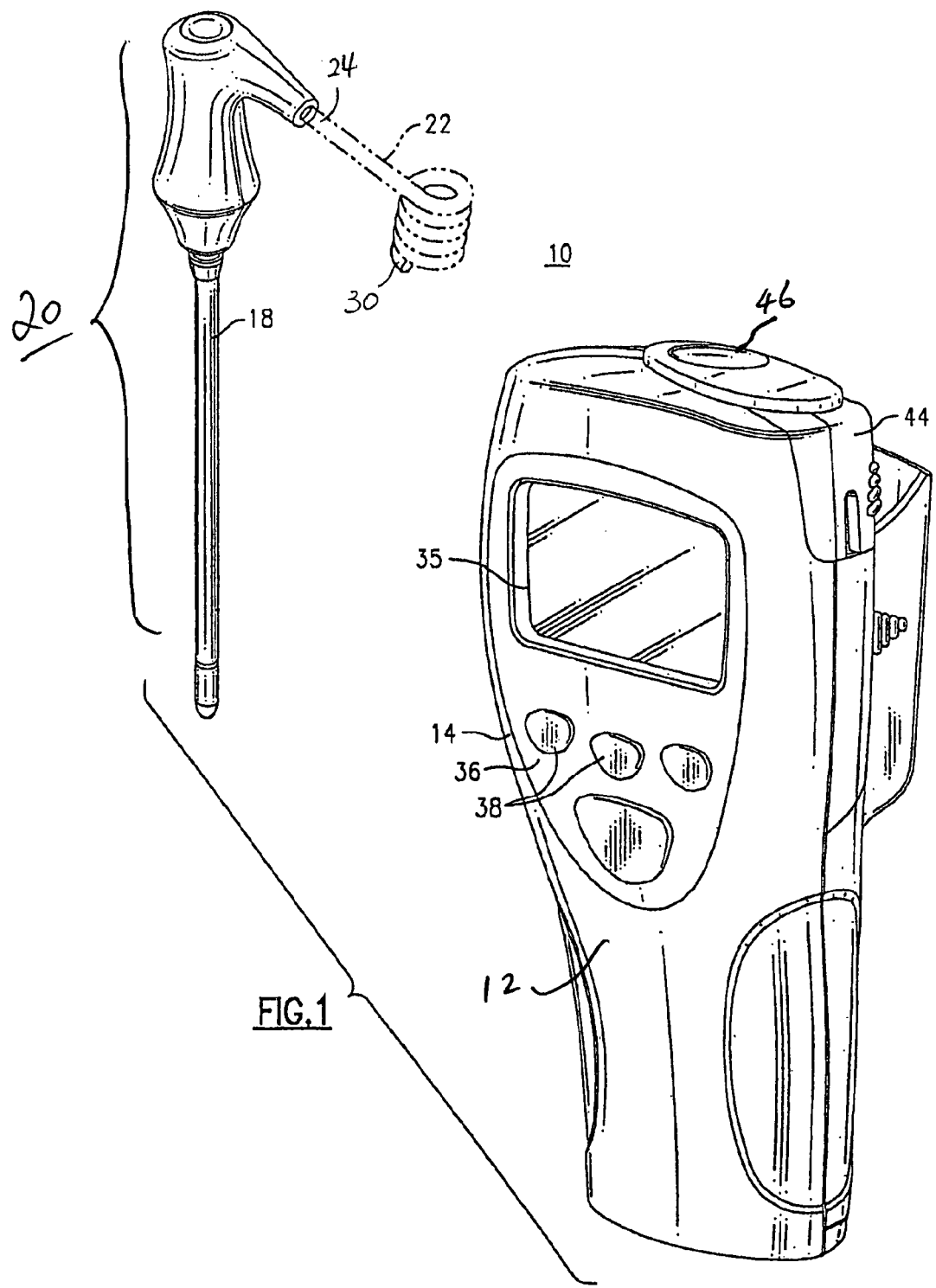
FIG. 1 is a perspective view of a thermometer embodiment.

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the course of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

The principles of the invention are illustrated through examples of electronic thermometers, but should not be construed to be limited to such. In general, the present invention provides a memory device associated with a reusable medical apparatus where the memory stores service information related to a reusable (and typically replaceable) part of the device. In one feature, the medical apparatus is a medical sensor apparatus that has at least one sensor for sensing one or more physical parameters relating to the object of the medical interrogation (human or animal). Examples of such sensor apparatus include vital signs monitors which measure vital signs including body temperature, blood pressure, pulse rate, respiratory rate, lung functions, intracranial pressure, weight, and blood oxygen saturation levels. Such monitors include thermometers, sphygmomanometers, spirometers, electronic stethoscopes, digital scales, pulse oximeters, and so on. They can be devices dedicated to the detection or monitoring of a single vital sign or of a multiple vital signs. For example, one embodiment of such a device is the Spot Vital Signs® Monitor manufactured by Welch Allyn of New York, which measures body temperature, blood pressure, and blood oxygen saturation. In another feature, the medical apparatus of the present invention interrogates conditions in the sensory organs including eye, ear, nose, throat and the rest of the oral tract. Examples of such devices include otoscopes, ophthalmoscopes, retinoscopes, autorefractors, tympanometers, audiometers, illuminators, rhinolaryngoscopes, and laryngoscopes.

For illustration purpose, the medical apparatus of the present invention can be an electronic thermometer of the type disclosed in co-owned U.S. Pat. No. 6,971,790, the entire content of which is herein incorporated by reference. As disclosed therein and illustrated here in FIG. 1, an electronic thermometer 10 includes a controlling base (or controller) 12 contained in a housing 14, and a probe assembly 20 that is tethered to the base 12 by means of a flexible electrical cord 22, shown partially and in phantom in FIG. 1. The cord 22 has a probe end 24 and an opposite end 30 that couples to the base 12, which, in term, houses controlling electronics (not shown) programmed to control the operation of the thermometer and to calculate temperatures from outputs received from the probe assembly 20. The base 12 also includes a user interface 36 that includes a display 35, as well as a plurality of actuable buttons 38 for operating the thermometer 10. The thermometer 10, in one embodiment, is powered by batteries (not shown) that are contained within the housing 14. Obviously, it can also be powered by an external electric source. The probe assembly 20 includes a heat-conducting, temperature probe 18 tethered to the base housing 14 by the flexible cord 22 and is retained within a chamber 44 which is releasably attached to the base housing 14. The chamber 44 includes a receiving cavity 46 that provides a fluid-tight seal around the probe 18, once inserted, with respect to the remainder of the housing 14's interior. Details of the chamber 44 is separately described in co-owned U.S. Ser. No. 10/268,844, the entire contents of which are herein incorporated by reference. The probe 18 is sized to fit within a patient body site (e.g., sublingual pocket, rectum, etc.). The probe assembly 20, alternately, the probe 18, is described herein as an example of a reusable part.

The present invention provides a mechanism for storing and updating probe-specific service information in a memory device associated with the thermometer 10. In a preferred embodiment and as illustrated by the block diagram in FIG. 2, the memory device 50 is disposed in the reusable part, in this case, the probe assembly 20, so that the memory device physically goes with the reusable part and there is no risk of associating the memory and its stored data with a wrong piece of reusable part. However, one skilled in the art can readily appreciate that the memory device can be physically located in a more permanent part of the medical apparatus such as base 12 of the thermometer 10, and be within the scope of the present invention.

Figure 2:
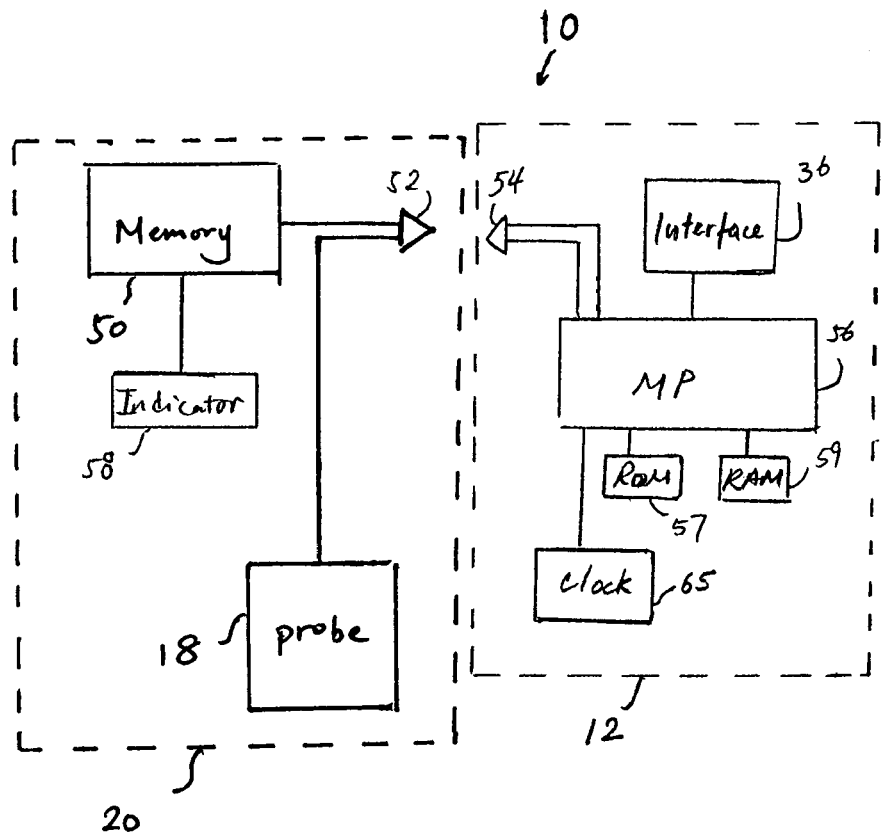
FIG. 2 is a block diagram of a thermometer embodiment that has incorporated the present invention.

Still referring to FIG. 2, the thermometer's controlling base 12 includes a user interface 36 electrically connected to controlling electronics that includes a microprocessor 56. In one embodiment, a read only memory (ROM) 57, which holds the algorithm performed by the microprocessor 56, and a random access memory (RAM) 59 for operation of the algorithm, are electrically connected to the microprocessor 56. Optionally, a real-time clock 65 that has an output electrically connected to an input of the microprocessor 56. The probe assembly 20 and the controlling base 12 connect to each other electrically through two mating connections 52 and 54. Once connected, the processing circuitry in the base 12 can interrogate the memory device 50 for the stored probe-specific service information. That information can be displayed directly, or after being processed, through the user interface 36. The displayed information can include a warning for the need for service (parts replacement, repair, recalibration, etc.). Alternatively, an indicator 58 can be actuated when such a need is detected. The indicator 58, in one embodiment, is disposed in the probe assembly 20, but can be disposed elsewhere in the thermometer 10.

In a preferred embodiment, the memory device 50 comprises a non-volatile memory which does not lose its data after power is terminated. Examples of suitable memory devices include electrical erasable programmable read-only memory unit (EEPROM), RAM, and so on.

The probe-specific service information that the memory device 50 records can include warranty-related information and error codes. Examples of warranty-related information include the manufacturing date of the probe, probe identification, warranty number, customer number, date of purchase/delivery, the expiration date of the warranty, and a formula for calculating the warranty. Some warranties expire after elapse of a time period from an event, e.g., manufacturing, purchase or first use. Other warranties expire after an amount of use cycle has been performed by the replaceable part, the probe in this case. As is described herebelow, the thermometer can be configured to count and record how many times the probe has been used. Storage of warranty-related information allows a user, through the user interface 36, to inquire about the warranty. Further, it allows a processing circuitry such as the microprocessor 56 in the thermometer base 12 to calculate if a warranty is still valid and still covers the probe. This information is important in a user's decision on servicing the thermometer and can eliminate unnecessary delays in initiating replacement orders, providing added safety and quality assurance for patients. If the warranty is determined to be valid and in effect, a request for a RMA number or label may be automatically submitted to the manufacturer.

Error codes stored in the memory device 50 provides a source for the processing circuitry in the thermometer to look up the exact problem when malfunction is detected. Instructions for further testing, if needed, and simple repair instructions may be displayed through the user interface. However, if repair by a professional service crew is needed, the correct contact information for the crew and the error code can be displayed so that a service call can be quickly and efficiently made. Other information that may be recorded on the memory device 50 includes probe identification (e.g., serial number), probe type, calibration data, date of last calibration, and so on.

Figure 3:
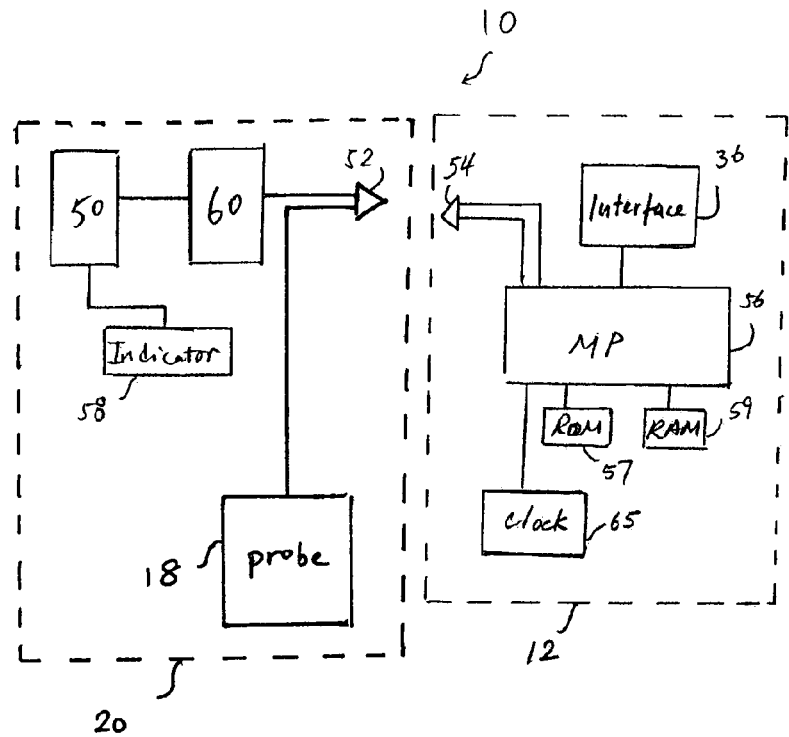
FIG. 3 is a block diagram of a second thermometer embodiment that has incorporated the present invention.

Another type of information that the memory device 50 can store is a usage count of the probe 18, and that information can be automatically updated each time the probe is used. Referring to FIG. 3, a counter 60 is preferably disposed in the probe assembly 20, but can be disposed elsewhere, e.g., in the thermometer base 12, as long as the counter 60 is electrically connected to the memory 50 during operation of the thermometer 10. The counter 60 is preferably a non-volatile counter that functions as an arithmetic unit to either add to a usage count or subtract from a preset value. Accordingly, a user may be able to view either the number of usage or the remaining amount of recommended usage for the installed probe. During use, the counter 60 is electrically connected to receive the same drive signals that actuate the probe 18, and accordingly, is able to count each use cycle. For example, the counter 60 may be programmed to add a count every time it detects electric currency for longer than, say, 5 seconds. Depending on the specific use pattern of the medical apparatus, the counter 60 can be further programmed to avoid overcounting. For example, in using a thermometer, a user may have to adjust the placement of the probe several times before getting a reliable reading. During such adjustment, the user may turn on the probe for short intervals. To avoid counting each of such interval as a complete usage cycle, the counter 60 may be programmed to undergo a waiting period, say, of 3 minutes, after each addition before it can start adding again. In one embodiment, the optional indicator 58 emits a signal, e.g., two seconds of flashing red light, when use cycle approaches or reaches a preset value. The signal can be programmed to progress to become more persistent as the probe stays in use. The signal serves as a reminder to the user that replacement parts should be sought or ordered. This can be very effective because the patient will likely receive the signal with uneasiness. Optionally, there can be an additional interlocking device, a power-off switch, or a similar device that disables the probe 18 when the usage exceeds a preset value. In one embodiment of the present invention, whether the warning signal has been emitted or not, the user can, through the user interface 36, access the data stored in the memory device 50 to find out how many times the probe has been used, how many use cycles are recommended by the manufacturer as the upper limit, or how much usage is left within the recommended parameter.

While the thermometer 10, standing alone, may be able to perform all the processing functions described above, the required processing power may add too much burden on the size, the weight and/or the cost of the thermometer. Accordingly, part of or the entire processing power can be supplied remotely, e.g., through a network connection. This approach may also alleviate the amount of memory required of the on-probe memory device 50 and results in a smaller and less expensive chip. For example, as long as the on-probe memory device 50 stores a serial number for the warranty, the details of the warranty and related information needed to calculate the validity of the warranty may be stored in a remote memory device.

Figure 4:
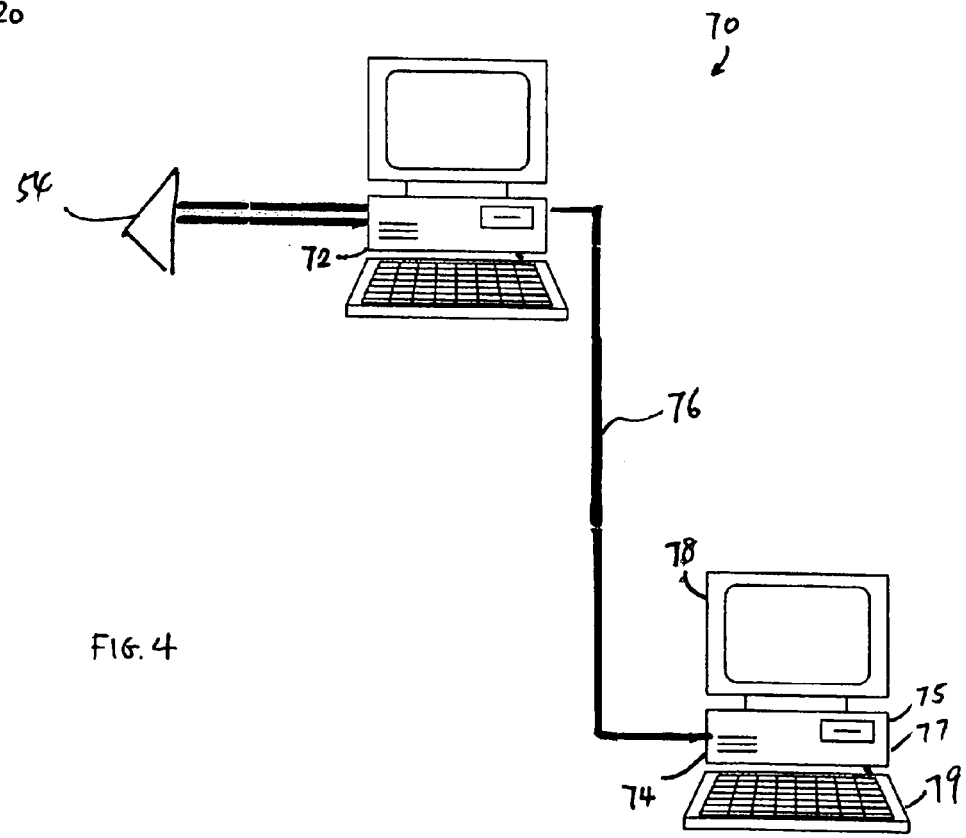
FIG. 4 is a block diagram of a remote processing embodiment of the present invention.

According to this aspect of the invention and referring now to the block diagram provided in FIG. 4, the right half of both FIGS. 2 and 3 can be replaced with a remote processing system 70 that is separate from and outside the electronic thermometer when the user decides to review service options regarding the thermometer. The processing circuitry connection 54 can be a network port that mates with the connection 52 of the probe assembly 20 (FIGS. 2 and 3). In a preferred embodiment, connection 54 is a universal serial bus (USB) port and connection 52 is a mating USB plug. Alternatively, a separate module or adapter (not shown) can be used to bridge between the probe assembly connection 52 and the processing circuitry connection 54.

The processing circuitry connection 54 may be part of a first local computer 72, in which case this computer may provide part or the entire processing needed. For example, from the first computer 72, the user may download an applet from a website, e.g., one maintained by the manufacturer, to accomplish extracting the probe-specific service information from the on-probe memory device 50. A dongle or another security device may be required for the access. The local computer 72 is located relatively close to where the thermometer is located, for example, in the same unit of the healthcare facility. In another embodiment, the first computer 72 is further connected to a second computer 74 through a network 76. The network 76 can be an internetwork (e.g., the Internet/World Wide Web, an extranet, or an intranet), a global area network (GAN), a wide area network (WAN), a metropolitan area network (MAN), a Local area network (LAN), or a personal area network (PAN). Further, the network 76 can be connected through wires using, e.g., Ethernet technology, or wireless using, e.g., Bluetooth technology. The second, more remote, computer 74 may include a processor 75, a memory 77, a display 78 and a data-input device 79 (e.g., keyboard). In a particular embodiment, the network 76 is the Internet/World Wide Web or an extranet.

In one embodiment, the more remote computer 74 is located at the thermometer manufacturer's facility and connected to its own database in order to expedite servicing of the thermometer. The advantage of such a connection is that many of the service calls can be automated or substantially sped up. For example, as described above, the present invention enables determination whether a warranty for the replaceable part (probe) is still valid and in effect. If so, and since the user is able to connect to the manufacturer, an RMA number or label can be automatically generated at any time, eliminating the need for such a call to the manufacturer during business hour. As another example, when malfunction is detected, a service call can be automatically sent to the manufacturer or the contracting repair crew, and the applicable error code is supplied with the call to make the repair more efficient.

Figure 5:
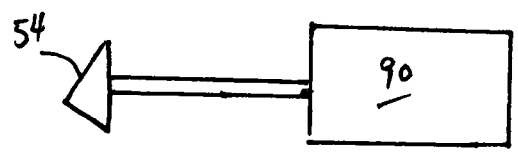
FIG. 5 is a block diagram of another embodiment of the present invention.

Alternatively, referring to FIG. 5, the processing circuitry connection 54, instead of being connected to a remote processor, may be part of a portable, preferably handheld, module 90 that has the processing power and any additional memory that is needed, and is installed with any special software needed for accomplishing the extracting and processing tasks. The portable module 90 should include a power source (e.g., battery) or connected to an external power source such that it can power up the memory chip on the probe.

Figure 6:
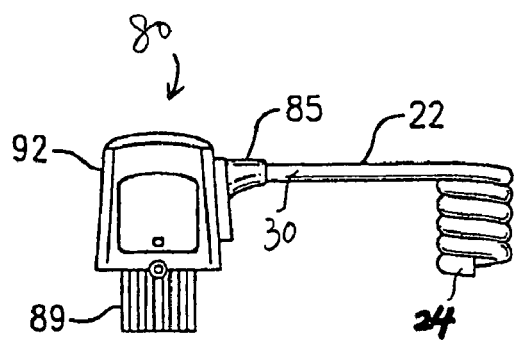
FIG. 6 is a front view of a connector assembly for the thermometer of FIG. 1.
Figure 7:
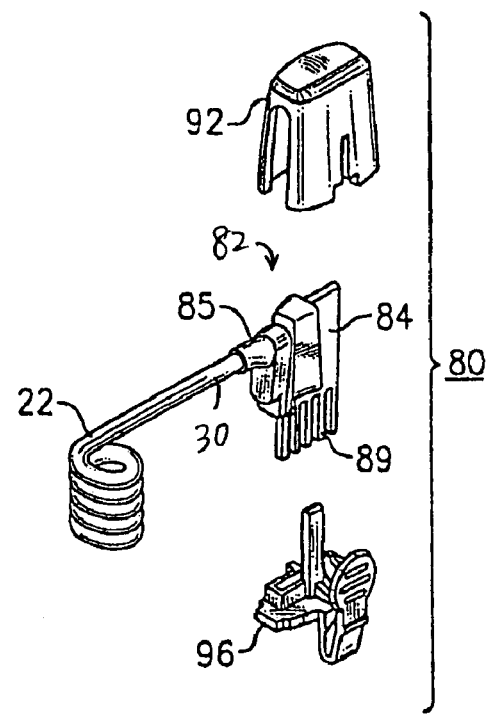

Referring now to FIGS. 6-8, an embodiment of the on-probe memory device is illustrated. In particular, the flexible cord 22 has one end 24 connected to the probe (see FIG. 1) and an opposite end 30 that leads into a connector 80 which houses the memory. The connector 80 includes an over-molded cable assembly 82 including a ferrule 85 for receiving the cable end 30 as well as a printed circuit board 84 having an EEPROM 88 and a counter 60 attached thereto. The connector 80 further includes a cover 92 which is snap-fitted over a frame 96, which is in turn snap-fitted onto the cable assembly 82. As such, the body of the EEPROM 88 and the counter 60 are shielded from the user while the programmable leads 89 extend from the edge and therefore become accessible for programming and via the base housing 14 (FIG. 1) for input to the processing circuitry when a probe 18 is attached to the probe end 24 of the cord 22. In other words, the programmable leads 89 can serve as the probe-side connection 52 depicted in FIGS. 2 and 3. The frame 96 includes a detent mechanism, which is commonly known in the field and requires no further discussion, to permit releasable attachment with an appropriate mating socket (not shown) on the base housing 14 (FIG. 1) and to initiate electrical contact therewith.

The probe-specific service information discussed above, such as error codes, and warranty number, can be added to the memory of the EEPROM 88 prior to assembly into the probe connector 80 through access to the leads 89 extending from the cover 92. Date of purchase and other service-related information may be added to the memory of the EEPROM 88 at the point of purchase or the first time the connector 80 is connected to a processing circuitry, whether the circuitry is inside the thermometer base unit 12 (FIGS. 2 and 3), a remote computer 74 (FIG. 4) or a handheld module 90 (FIG. 5). These data can then be accessed by the thermometer processing circuitry when the connector 80 is attached to the base housing 14 (FIG. 1).

While the present invention has been particularly shown and described with reference to the structures and methods disclosed herein and as illustrated in the drawings, it is not confined to the details set forth and this invention is intended to cover any modifications and changes as may come within the scope and spirit of the following claims.

We claim:

1. An electronic thermometer comprising:
    a controlling base disposed within a housing that retains controlling electronics programmed to at least calculate a sensed temperature;
    a probe assembly comprising a heat-conducting probe removably attached to the controlling base to communicate electrically with the controlling electronics; and
    an electronic memory associated with the probe assembly programmed to store and use at least one piece of probe-specific service information, wherein the at least one piece of probe-specific service information comprises the usage count of the probe and at least one of probe warranty information and error codes for malfunctions related to said probe, said thermometer further comprising a counter for generating the probe usage count, the counter being electrically coupled to the electronic memory for storing the usage count and the thermometer being configured to provide an indication that at least one of a replacement heat-conducting probe and an entire replacement probe assembly should be replaced, said indication being displayed to the user when the usage count of the probe reaches a predetermined number wherein the heat-conducting probe must first be detached from said controlling base for at least a predetermined time in order for said counter to trigger a usage count.

2. The thermometer of claim 1 wherein the electronic memory comprises an electrical erasable programmable read-only memory (EEPROM).

3. The thermometer of claim 1 wherein the controlling base further comprises a user interface comprising a display and at least one button that controls operation of the thermometer, wherein the controlling electronics comprises a microprocessor.

4. The thermometer of claim 1 wherein said thermometer is configured to present a first indicator signal comprises a message for user action when the usage count is at a first threshold that is lower than the predetermined number and a second indicator signal when the usage count is at a second threshold at the predetermined number.

5. The thermometer of claim 1 wherein the thermometer further comprises an indicator a display for generating said indicator signals.

6. The thermometer of claim 1 wherein a determination is made as to whether the probe warranty is still in effect and, if so, information useful for requesting a return merchandise authorization number.

7. The thermometer of claim 1 wherein error information useful for initiating a service call or otherwise remedying the detected malfunction is displayed.

8. The thermometer of claim 1 wherein the electronic memory further stores identification information of the probe.

9. The thermometer of claim 1 wherein the electronic memory is disposed in the controlling base.

10. The thermometer of claim 1 wherein the electronic memory is disposed in a connector in electronic communication with the heat-conducting probe, the connector providing removable electrical connection between the probe assembly and the controlling electronics.

11. The thermometer of claim 10 wherein the connector comprises a programmable lead accessible for programming.

12. The thermometer of claim 10 wherein the connector comprises an electrical erasable programmable read-only memory (EEPROM).

13. A system for servicing a reusable medical apparatus, the system comprising:
 a reusable medical apparatus comprising a reusable part and an electronic memory associated with the reusable part, the electronic memory being programmed to use and store at least one piece of service information specific to the reusable part, and
 a remote processing system programmed to process the at least one piece of service information for servicing the reusable medical apparatus wherein said at least one piece of service information comprises a usage count of the reusable part and at least one of error codes relating to the reusable part and warranty information pertaining thereto, the reusable medical apparatus further comprising a counter for generating the usage count of said reusable part, the counter being electrically coupled to the electronic memory for storing the usage count and wherein the remote processing system is programmed to display information for ordering the reusable part generate a signal when the usage count of the reusable part reaches a predetermined number and to display information for ordering a replacement for the reusable part, and in which said counter is configured to generate a usage count of said reusable part, said usage count being generated only after said reusable part has been removed from said apparatus for a predetermined time period that is stored in said electronic memory, in which removal of said reusable part initiates the tolling of said predetermined time period and in which said time period must be exceeded before said counter generates a usage count of said reusable part, and
 wherein the medical apparatus is selected from at least one of the group consisting of a thermometer, spirometer, pulse oximeter, sphygmomanometer, electronic stethoscope, otoscope, ophthalmoscope, retinoscope, autorefractor, tympanometer, audiometer, illuminator, laryngoscope, and rhinolaryngoscope.

14. The system of claim 13 wherein at least part of said remote processing system is disposed in a local computer.

15. The system of claim 13 wherein at least part of said remote processing system is disposed in a handheld module.

16. The system of claim 13 wherein the reusable medical apparatus is plugged into a Universal Serial Bus (USB) port for connecting to the network that allows access to the remote processing system.

17. The system of claim 13 wherein the reusable medical apparatus comprises a medical sensor apparatus.

18. The system of claim 13 wherein the reusable medical apparatus comprises a vital signs monitor.

19. The system of claim 13 wherein the electronic memory comprises an electrical erasable programmable read-only memory (EEPROM).

20. The system of claim 13 wherein the remote processing system is programmed to generate a return merchandise authorization number if the warranty is in effect.

21. The system of claim 13 wherein the remote processing system is programmed to provide error information useful for initiating a service call or otherwise remedying the detected malfunction.

22. The system of claim 13 wherein the remote processing system is programmed to initiate a service call.

23. The system of claim 13 wherein the electronic memory further stores identification information of the reusable part.

24. The system of claim 13 wherein the reusable medical apparatus comprises an instrument for interrogating a sensory organ selected from at least one of the group consisting of the eye, ear, nose, throat, oral tract and skin.

25. The system of claim 13 wherein the reusable medical apparatus comprises an electronic thermometer that comprises:
 (a) a controlling base that houses controlling electronics programmed to at least calculate a sensed temperature; and
 (b) a probe assembly comprising a reusable, heat-conducting probe removably attached to the controlling base to communicate electrically with the controlling electronics and the electronic memory and in which said counter is caused to generate a usage count only after said heat-conducting probe has been removed from said controlling base for said predetermined time.

26. The system of claim 25 wherein the electronic memory is disposed in a connector in electrical communication with the heat-conducting probe, the connector providing removable electrical connection between the probe assembly and the controlling electronics.

27. The system of claim 26 wherein the connector comprises a programmable lead accessible for programming.

28. The system of claim 13 wherein at least part of the remote processing system is connected to said electronic memory through a network.

29. The system of claim 28 wherein said network comprises the Internet.

30. The system of claim 28 wherein said network comprises an extranet or intranet.

31. The system of claim 13 wherein the remote processing system is programmed to initiate an order for the replacement for the reusable part when the usage count of the reusable part reaches a predetermined number.

32. The system of claim 31 wherein the remote processing system is programmed such that the order requires confirmation for completing the order.

33. The system of claim 31 wherein the remote processing system is programmed to complete the order without further confirmation.

34. A method for cycle counting in regard to an electronic thermometer, said thermometer comprising a controlling base and a probe assembly tethered to said controlling base, said probe assembly including a temperature probe for measuring body temperature, said method comprising the steps of:

disposing controlling electronics programmed to at least calculate a sensed temperature;

providing a probe assembly comprising a replaceable heat-conducting probe removably attached to the controlling base to communicate electrically with the controlling electronics;

providing an electronic memory associated with the probe assembly programmed to store at least one piece of probe-specific service information, wherein the at least one piece of probe-specific service information comprises a usage count of said thermometer;

storing usage count in said electronic memory; and displaying information useful to the user for ordering at least one of a replacement heat-conducting probe and an entire replacement probe assembly when the usage count of the probe reaches a predetermined threshold and in which a valid usage count of said probe assembly is determined by the steps of:

determining the amount of time the probe assembly of said thermometer has been detached from said controlling base; and if the amount of time the probe assembly has been detached has exceeded a predetermined amount of time, then generating a usage count for use in said storing step.

* * * * *